United States Patent [19]

Hattori et al.

[11] Patent Number: 4,467,901
[45] Date of Patent: Aug. 28, 1984

[54] TEMPERATURE RESPONSIVE, PNEUMATICALLY ACTUATED, FLUID SHEAR, COOLING FAN CLUTCH AND A CONTROL PROVIDING THREE STEP VARIATION THEREOF

[75] Inventors: Kenji Hattori; Kongou Aoki, both of Kariya; Masaharu Hayashi, Toyota, all of Japan

[73] Assignee: Aisin Seiki Kabushiki Kaisha, Japan

[21] Appl. No.: 346,250

[22] Filed: Feb. 5, 1982

[30] Foreign Application Priority Data

Feb. 13, 1981 [JP] Japan .............................. 56-19860[U]

[51] Int. Cl.³ ....................... F16D 35/00; F16D 43/25
[52] U.S. Cl. .................................. 192/52; 192/58 B; 192/82 T; 192/85 V
[58] Field of Search ................. 192/58 B, 82 T, 85 V, 192/85 R, 52

[56] References Cited

U.S. PATENT DOCUMENTS

| | | | |
|---|---|---|---|
| 2,307,619 | 1/1943 | Brewer | 192/85 V X |
| 2,877,751 | 3/1959 | Johnston | 192/82 T |
| 3,272,293 | 9/1966 | Heater | 192/58 B |
| 3,323,623 | 6/1967 | Roper | 192/58 B |
| 3,625,322 | 12/1971 | Nagamatsu et al. | 192/85 R X |
| 3,754,626 | 8/1973 | Heidorn | 192/82 V X |
| 3,757,914 | 9/1973 | Elmer | 192/82 T X |
| 3,880,265 | 4/1975 | Elmer | 192/82 T X |
| 3,902,663 | 9/1975 | Elmer | 192/82 T X |
| 3,961,606 | 6/1976 | Wong | 192/82 T X |
| 3,990,556 | 11/1976 | Hayashi et al. | 192/58 B |
| 4,056,178 | 11/1977 | Detty | 192/58 B |
| 4,065,052 | 12/1977 | Ridendur | 192/82 T X |
| 4,189,095 | 2/1980 | Monigold et al. | 192/82 T X |
| 4,228,880 | 10/1980 | Gee | 192/82 T X |
| 4,231,457 | 11/1980 | Cornish | 192/82 T |
| 4,295,550 | 10/1981 | Hayashi | 192/58 B |
| 4,298,111 | 11/1981 | Hayashi | 192/58 B |
| 4,351,425 | 9/1982 | Bopp | 192/82 T X |
| 4,365,592 | 12/1982 | Bopp | 192/82 T X |

FOREIGN PATENT DOCUMENTS

| | | | |
|---|---|---|---|
| 0038835 | 4/1978 | Japan | 192/58 B |
| 0069327 | 5/1980 | Japan | 192/82 T |

Primary Examiner—Rodney H. Bonck
Assistant Examiner—David D. House
Attorney, Agent, or Firm—Finnegan, Henderson, Farabow, Garrett & Dunner

[57] ABSTRACT

A cooling fan device for use with an internal combustion engine in which there is provided a viscous fluid coupling operable to control the speed of rotation of a fan for cooling a radiator in response to variation in the temperature of the engine. A partition plate is provided in a fluid-tight chamber so as to divide the chamber into a working chamber and a reservoir chamber. The partition plate has two holes which allow fluid flow from the reservoir chamber to the working chamber. Two valves, one for each hole, are provided which are normally biased to close the holes. One of the valves is attached to a slidable plug which moves in response to temperature change; the other valve is positioned to be engaged by the first valve. Changeover valves control the movement of the plug by allowing suction air pressure or atmospheric air pressure to enter a diaphragm at one end of the plug as the engine temperature varies and thereby open or close the holes.

1 Claim, 1 Drawing Figure

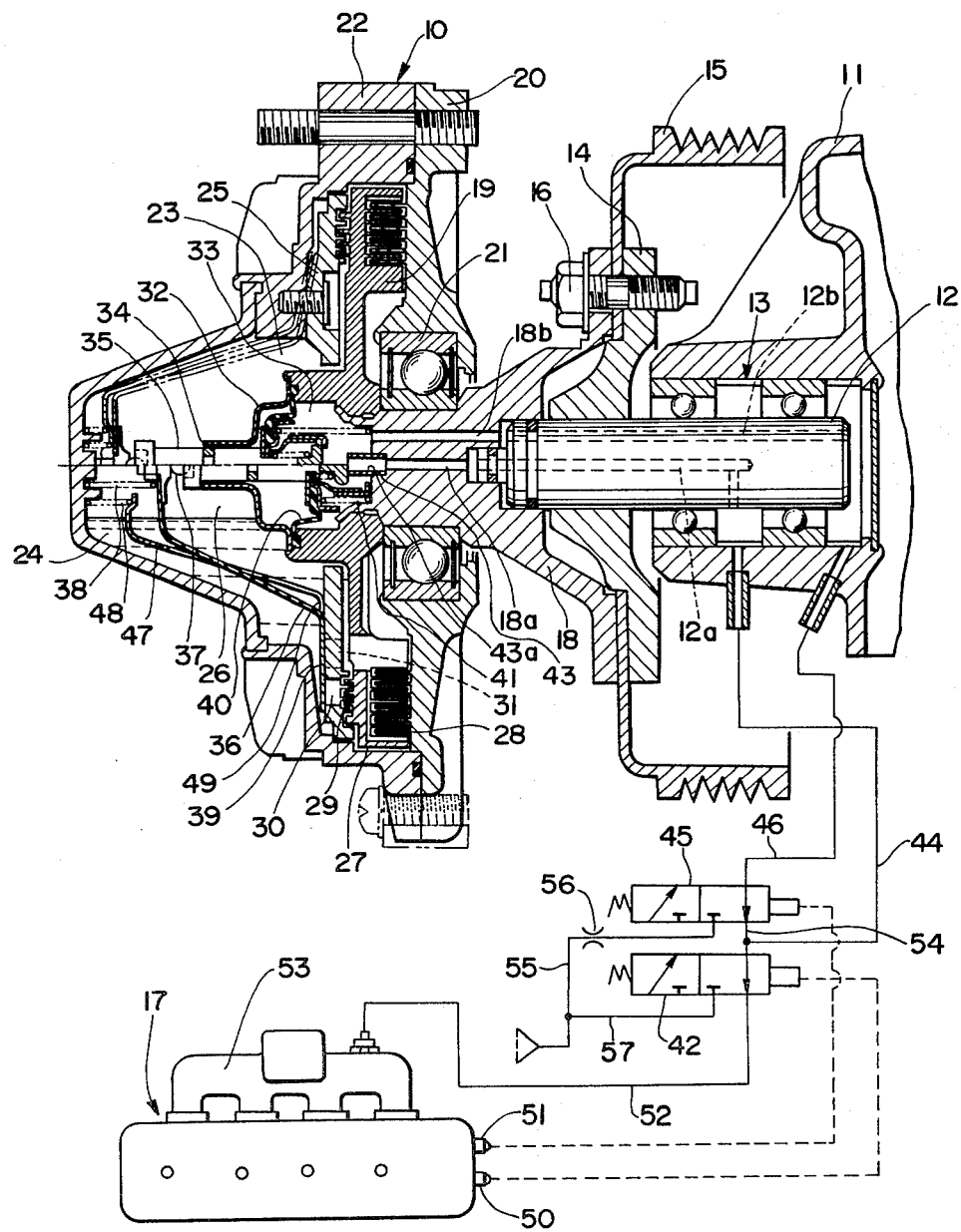

TEMPERATURE RESPONSIVE, PNEUMATICALLY ACTUATED, FLUID SHEAR, COOLING FAN CLUTCH AND A CONTROL PROVIDING THREE STEP VARIATION THEREOF

This invention relates to a cooling fan device for use with an internal combustion engine, particularly but not exclusively, mountable on a vehicle.

Hithertofore, there has been designed a cooling fan device which comprises a viscous fluid coupling drivingly connected between an associated engine and a fan for cooling the engine cooling water, and controlled in a multiple step by, for example, a bimetal temperature sensor responsive to the temperature of air which has passed through a radiator of the engine, in order to control the speed of rotation of the fan. However, such a device is disadvantageous in that the speed of rotation of the fan would be increased only by increase in the temperature in the space in which the engine is located, nevertheless the temperature of water flowing into the radiator is still low.

It is, therefore, an object of the present invention to provide a cooling fan device for use with an internal combustion engine in which the above-mentioned drawbacks of the prior art are removed.

Another object of the invention is to provide a cooling fan device operable with good response, high reliability and high performance.

According to the present invention, there is provided a cooling fan device for use with an internal combustion engine comprising a viscous fluid coupling means which includes an input means drivingly connected to the engine, an output means provided with a fan for cooling a radiator of the engine and rotatable relative to said input means, and said input and output means defining therebetween a working chamber into which an amount of viscous fluid can be admitted to hydrodynamically transmit rotational power from said input means to said output means, and means for sensing the temperature of cooling water in the engine to vary the degree of communication between said working chamber and a viscous fluid reservoir to cause a multiple stepwise control of the amount of the viscous fluid in said working chamber thereby multi-stepedly varying the speed of rotation of said fan.

The above and other objects and features of the present invention will become apparent from the following descriptions of the preferred embodiments with reference to the accompanying drawings, in which:

The accompanying drawing is a side elevation in section of an example of a cooling fan device in accordance with the present invention operationally connected to an associated internal combustion engine schematically shown.

Referring to the drawing, there is shown a cooling fan device having a viscous fluid coupling 10 mounted on a fixed portion 11 of a vehicle. The coupling 10 comprises a shaft 12 rotatably supported by the fixed portion 11 through a bearing 13. A flange member 14 is fixed to the shaft 12 and a belt wheel 15 is fixed by bolts 16 (only one being seen in the drawing) to the flange member 14. The belt wheel 15 is connected by V-belts (not shown) to a rotary shaft of an internal combustion engine 17 so that the belt wheel 15 is, in operation, rotated at a predetermined speed. An input member 18 is provided co-axially with the shaft 12 and fixed at its one end to the flange member 14 by the bolts 16 together with the belt wheel 15. An input disc or rotor 19 is fixed to the opposite end of the input member 18. A disc-like output member or a hub of a cooling fan 20 is supported on a mid-portion of the input member 18 through a bearing 21 so as to be rotatable relative to the member 18 and the disc 19. An outer cover member 22 is fixed at its periphery to the output member 20 in fluid tight relationship therewith to define a chamber 23 together with the outut member 20. An appropriate amount of viscous fluid 24 is contained in the chamber 23. A partition plate 25 is fixed at its outer periphery to the cover member 22 to divide the chamber 23 into a reservoir chamber 26 and a working chamber 27. Input disc 19 is confined within the chamber 27 and a first group of labyrinth grooves 28 is formed in opposed surfaces of the input disc 19 and the output member 20. A second group of labyrinth grooves 29 is formed in surfaces of the input disc 19 and the partition plate 25. Two spaced holes 30 and 31 are formed in the partition plate 25 for permitting fluid communication between the reservoir and working chambers 26 and 27.

There is further provided an inner cover member 32 which is co-axially fixed in fluid tight relationship at its outer periphery to the boss of the input disc 19 to define an air chamber 33. The inner cover member 32 is formed with a center opening 34 through which an axially slidable plug 35 extends in sealing relationship therewith. The plug 35 supports at its outer end a first valve member 36 through a thrust bearing 37, the valve member 36 being urged by a spring 38 towards the plug 35 and provided at its outer periphery with a radially extending flat surface portion 39 which serves to open or close the hole 30 of the partition plate 25, as the valve member 36 axially moves as described below.

A diaphragm 40 is provided within the air chamber 33, the outer periphery of the diaphragm 40 being fixed to the boss of the input member 18 and the inner periphery of the diaphragm 40 being fixed to the inner opposite end of the plug 35 which is subjected to the action of a further spring 41 for balancing against the force of the spring 38. The air chamber 33 is communicated with a first change-over valve 42 by way of a center bore 43a of a stop 43, a first axial bore 18a of the input member 18, a first axial bore 12a of the shaft 12 and a conduit 44. The air chamber 33 is also communicated with a second change-over valve 45 by way of a second axial bore 18b of the input member 18, a second axial bore 12b of the shaft 12 and a further conduit 46.

Further provided in the reservoir chamber 26 is a second valve member 47 which is supported at its inner periphery by a spring 48 provided co-axially with the spring 38, the valve member 47 being provided at its outer periphery with a radially extending flat surface portion 49 for abutting against the partition plate 25 under the resilience of the spring 48 to close the hole 31 thereof, and the position of the second valve member 47 relative to the other parts being such that when the plug 35 is in its rightmost position shown in the lower half portion of the drawing and in which the inner end of the plug 35 abuts against the stop 43, the flat surface portion 39 of the first valve member 36 closes the hole 30 and the flat surface portion 49 of the second valve member 47 also closes the hole 31. In the event that the plug 35 is axially moved leftwards to its intermediate position, the valve member 36 is also moved leftwards to open the hole 30 causing fluid communication therethrough between the reservoir and working chambers 26 and 27.

As the plug 35 and thus the valve member 36 further move leftwards to the leftmost position shown in the upper half portion of the drawing, the inner periphery of the valve member 36 is brought into engagement with the inner periphery of the valve member 47 to urge the latter against the action of the spring 48, so that the flat surface portion 49 of the valve member 47 is brought out of engagement with the partition plate 25 to open the hole 31 causing fluid communication between the chambers 26 and 27 through both of the holes 30 and 31.

The change-over valves 42 and 45 are operated in response to signals derived from temperature sensors 50 and 51, respectively, provided on the engine 17 for sensing changes in the temperature of the cooling water flowing therethrough. When the temperature of the cooling water is lower than a first predetermined value, the change-over valves 42 and 45 are operated so that the conduit 44 is brought into communication through a conduit 52 with an air intake manifold 53 of the engine 17 to supply a negative pressure to the chamber 33 and the conduit 46 is also brought into communication through a conduit 54 with the conduit 44 to supply the negative pressure to the chamber 33 and thus the plug 35 is in its rightmost position so that both the holes 30, 31 are closed and the amount of the viscous fluid 24 within the working chamber 27 is reduced to thereby reduce the power to be transmitted from the input member 18 to the output member 20 to maintain the rotation of the cooling fan at a low speed.

When the temperature of the cooling water rises up to a second predetermined value, the change-over valve 42 remains unmoved, but the change-over valve 45 is operated so that the conduit 46 is disconnected from the conduit 54 and is brought into communication with atmosphere through a conduit 55 having a restriction 56 to supply a restricted flow of air of the atmospheric pressure to the chamber 33, thereby moving the plug 35 leftwards to the intermediate position to open the hole 30 so that the amount of the viscous fluid 24 within the working chamber 27 is increased to increase the power to be transmitted from the input member 18 to the output member 20 thereby increasing the speed of rotation of the cooling fan.

When the temperature of the cooling water further rises up to a third predetermined value, the change-over valve 42 is operated so that the conduit 44 is disconnected from the conduit 52 and is brought into commmunication with atmosphere through a non-restricted conduit 57 to supply the atmospheric pressure to the chamber 33 to move the plug 35 to the leftmost position in which the valve member 47 opens the hole 31 as described above, and thus the working chamber 27 is in communication with the reservoir chamber 26 through both of the holes 30 and 31, so that the amount of the viscous fluid in the chamber 27 is further increased to increase the speed of rotation of the cooling fan.

The invention has thus been shown and described with reference to specific embodiment, however, it should be noted that the invention is in no way limited to the details of the illustrated structures but changes and modifications may be made without departing from the scope of the appended claims.

We claim:

1. A cooling fan device for use with an internal combustion engine, comprising a viscous fluid coupling means which includes an input means drivingly connected to the engine, an output means provided with a fan for cooling a radiator of the engine and rotatable relative to said input means, a fluid-tight chamber, a partition plate for dividing said chamber into a viscous fluid working chamber and a viscous fluid reservoir chamber, said input means being on the working chamber side of said partition plate, said partition plate having a first and a second hole for permitting viscous fluid communication between said reservoir chamber and said working chamber to hydrodynamically transmit rotational power from said input means to said output means, and stepwise control means for controlling the amount of viscous fluid in said working chamber, said stepwise control means including means for sensing the temperature of cooling water in the engine, a slidable plug on the reservoir chamber side of said partition plate, an inner cover secured to said input means to form an air chamber therein, said inner cover having a center opening through which said slidable plug extends in sealing relationship therewith, a diaphragm dividing said air chamber into two opposed chambers, the outer periphery of said diaphragm being fixed to said input means and the inner periphery of said diaphragm being attached to an inner end of said slidable plug, a first valve plate secured to an outer end of said plug to open or close said first hole of said partition plate, a second valve plate positioned to be engaged by said outer end of said plug to open or close said second hole of said partition plate, first and second changeover valve means connected to a source of suction air pressure and a source of atmospheric air pressure, first passage means connecting said first changeover valve means and a first one of said opposed chambers, second passage means connecting said second changeover valve means and said first opposed chamber, each said change-over valve means being for regulating in accordance with the temperature of the engine cooling water the supply of suction pressure and atmospheric pressure through each respective passage means into said first opposed chamber defined by said diaphragm for moving said plug and each said valve plate secured thereto to effect a three stepwise control of viscous fluid flowing to said working chamber and provide a three stepwise variation in the speed of rotation of said fan.

* * * * *